United States Patent [19]
Jaster et al.

[11] Patent Number: 5,150,583
[45] Date of Patent: Sep. 29, 1992

[54] APPARATUS FOR CONTROLLING A DUAL EVAPORATOR, DUAL FAN REFRIGERATOR WITH INDEPENDENT TEMPERATURE CONTROLS

[75] Inventors: Heinz Jaster; Warren F. Bessler, both of Schenectady, N.Y.

[73] Assignee: General Electric Company, Schenectady, N.Y.

[21] Appl. No.: 834,089

[22] Filed: Feb. 12, 1992

Related U.S. Application Data

[62] Division of Ser. No. 739,364, Aug. 2, 1991, Pat. No. 5,109,678, which is a division of Ser. No. 561,044, Aug. 1, 1990, Pat. No. 5,056,328, which is a division of Ser. No. 293,034, Jan. 3, 1989, Pat. No. 4,966,010.

[51] Int. Cl.⁵ .............................................. F25D 17/00
[52] U.S. Cl. ......................................... 62/179; 62/526
[58] Field of Search ................ 62/175, 179, 180, 203, 62/526

[56] References Cited

U.S. PATENT DOCUMENTS

| | | | |
|---|---|---|---|
| 3,005,321 | 10/1961 | Devery | 62/186 |
| 3,107,502 | 10/1963 | Herndon, Jr. et al. | 62/180 |
| 3,119,240 | 1/1964 | Devery | 62/156 |
| 3,359,751 | 12/1967 | Stevens | 62/186 |
| 3,455,119 | 7/1969 | Bright | 62/180 |
| 4,416,119 | 11/1983 | Wilson et al. | 62/180 X |

Primary Examiner—William E. Wayner
Attorney, Agent, or Firm—Patrick R. Scanlon; James C. Davis, Jr.; Paul R. Webb, II

[57] ABSTRACT

A refrigerator apparatus is provided having a cabinet with a freezer compartment and a fresh food compartment. The compartments define two passageways allowing air circulation therebetween. A refrigerator system is included having a compressor, a condenser, an expansion valve, an evaporator situated in the freezer compartment. The refrigerator system elements are connected in series in a closed loop, in a refrigerant flow relationship. A first fan is situated in the freezer compartment for providing air flow over the evaporator. A second fan is situated in one of the two passageways for providing air circulation between the two compartments. A first thermostatic controlller situated in the freezer compartment for maintaining a desired temperature in the freezer compartment by causing the compressor and the first fan to operate. A second thermostatic controller situated in the fresh food comaprtment for maintaining a desired temperature in the fresh food compartment by causing operation of the second fan circulating air between the compartments thereby cooling the fresh food compartment.

1 Claim, 6 Drawing Sheets

APPARATUS FOR CONTROLLING A DUAL EVAPORATOR, DUAL FAN REFRIGERATOR WITH INDEPENDENT TEMPERATURE CONTROLS

This application is a division of application Ser. No. 07/739,364 filed Aug. 2, 1991, now U.S. Pat. No. 5,109,678 which is a division of application Ser. No. 07/561,044, filed Aug. 1, 1990 and now U.S. Pat. No. 5,056,328, which is a division of application Ser. No. 07/293,034, filed Jan. 3, 1989, and now U.S. Pat. No. 4,966,010.

CROSS REFERENCE TO RELATED APPLICATIONS

This application is related to copending application Ser. No. 07/288,848, filed Dec. 23, 1988, and now abandoned, entitled "Refrigerator System With Dual Evaporator for Household Refrigerators", assigned to the same assignee as the present invention.

BACKGROUND OF THE INVENTION

The present invention relates to controls for independently adjusting the temperatures in the freezer and fresh food compartments in a refrigerator having an evaporator in the freezer compartment and an evaporator in the fresh food compartment.

The presently used refrigeration cycle in household refrigerators is the simple vapor compression type using a single evaporator. Relative cooling rates for the freezer and the fresh food compartments are controlled by the user. A user adjusted control, sets the fixed fraction of the total cold air flow provided by the single evaporator and fan which is to reach the two refrigerator compartments. When the temperature of the fresh food compartment rises above a preset level, the compressor operates allowing the evaporator to supply cold air. Since the fraction of cold air provided to the fresh food and freezer compartments does not vary once set, control of freezer temperature is imperfect and freezer air temperatures vary considerably. Changes in the ambient temperature, time defrosts of the freezer compartment, and changes of incidental thermal loads (door opening frequency and duration) requires time varying changes in the fraction of cold air delivered to both compartments to properly control the temperature in both compartments.

In a refrigeration cycle having dual evaporators such as the one shown in copending application Ser. No. 07/288,848, hereby incorporated by references, distinct cooling rates are provided by each evaporator during steady state operation. One evaporator operates at a temperature of approximately −10° F. and the other at approximately 25° F. to provide cold air to the freezer and fresh food compartments, respectively. The cooling rates of the two evaporators depend entirely on heat exchanger and compressor designs, choice of refrigerant, ambient temperature, refrigerator cabinet thermal conductance and thermal loads other than conduction to the ambient. To provide separate and distinct narrow temperature ranges of operation in each of a refrigerators two compartments, provisions must be made to adjust the relative cooling rates of the two evaporators in response to changing ambient temperatures and incidental thermal loads.

It is an object of the present invention to provide a control for regulating the cooling rates of a refrigerator equipped with a dual evaporator refrigerator system.

SUMMARY OF THE INVENTION

In one aspect of the present invention, a refrigerator apparatus is provided having a cabinet with a freezer compartment and a fresh food compartment. The compartments define two passageways allowing air circulation therebetween. A refrigerator system is included having a compressor, a condenser, an expansion valve, an evaporator situated in the freezer compartment. The refrigerator system elements are connected in series in a closed loop, in a refrigerant flow relationship. A first fan is situated in the freezer compartment for providing air flow over the evaporator. A second fan is situated in one of the two passageways for providing air circulation between the two compartments. A first thermostatic controller situated in the freezer compartment for maintaining a desired temperature in the freezer compartment by causing the compressor and the first fan to operate. A second thermostatic controller situated in the fresh food compartment for maintaining a desired temperature in the fresh food compartment by causing operation of the second fan circulating air between the compartments thereby cooling the fresh food compartment.

In another aspect of the present invention a refrigerator apparatus is provided having a freezer compartment, a fresh food compartment, and a refrigerator system. The refrigerator system includes a first expansion valve, a first evaporator situated in the freezer compartment, a first and second compressor, a condenser, a second expansion valve, and a second evaporator situated in the fresh food compartment. All of the elements of the refrigerator system are connected in series, in the order listed in a refrigerant flow relationship. A phase separator connects the second evaporator to the first expansion valve in a refrigerant flow relationship. The phase separator provides intercooling between the first and second compressors. A first fan is situated in the freezer compartment for providing air flow over the first evaporator. A second fan is situated in the fresh food compartment for providing air flow over the second evaporator. A servovalve connected to the input of the first compressor reduces the refrigerant mass flow rate through the first evaporator when the servovalve is activated. A first thermostatic controller is situated in the freezer compartment for maintaining a desired temperature in the freezer compartment by causing operation of the compressor and the fans. A second thermostatic controller is situated in the fresh food compartment for maintaining a desired temperature in the fresh food compartment by causing operation of the servovalve reducing the mass flow rate in the first evaporator.

In still another aspect of the present invention a refrigerator apparatus is provided including a freezer compartment, a fresh food compartment and a refrigerator system. The refrigerator system has a compressor, a condenser, a first expansion valve, a first evaporator situated in the freezer compartment, a second expansion valve, a second evaporator situated in the fresh food compartment. The refrigerator system elements are connected in series in a closed loop in a refrigerant flow relationship. A first fan is situated in the freezer compartment for providing air flow over the first evaporator. A second fan is situated in the fresh food compartment for providing air flow over the second evaporator. A first thermostatic controller is situated in the freezer compartment for maintaining a desired temperature in the freezer compartment by causing operation of the compressor and the first fan. A second thermostatic controller is situated in the fresh food compartment for maintaining a desired temperature in the fresh food compartment by causing the second second fan to operate as necessary when the compressor is operating.

BRIEF DESCRIPTION OF THE DRAWING

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawing, in which:

DETAILED DESCRIPTION OF THE INVENTION

Figure 1:
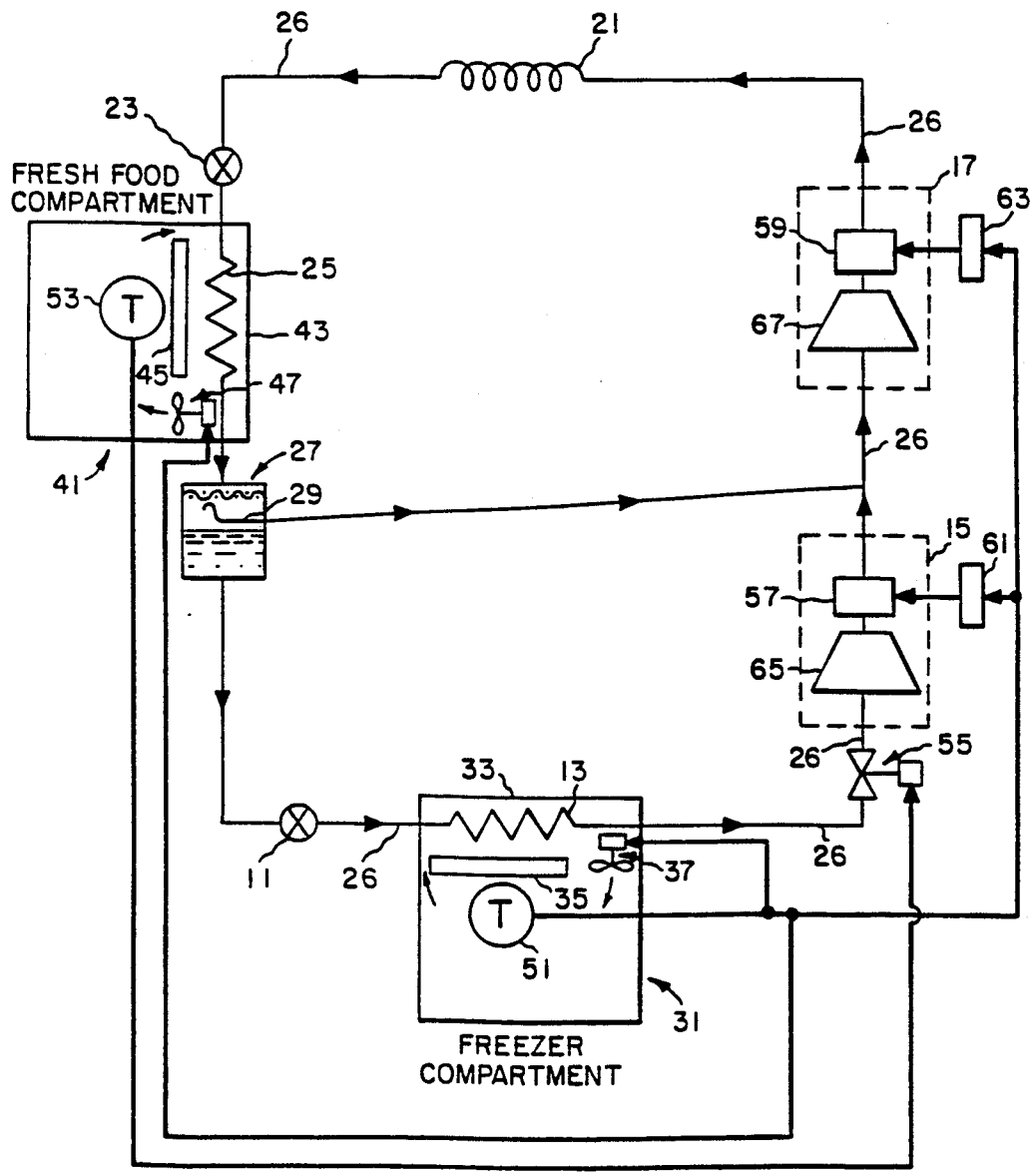
FIG. 1 is a schematic representation of one embodiment of the dual evaporator refrigerator system with a control for controlling the relative cooling rates of the evaporators, in accordance with the present invention.

Referring now to the drawing wherein like numerals indicates like elements throughout and more particularly FIG. 1 thereof. A dual evaporator two stage cycle with a control is shown. The dual evaporator two stage system comprises a first expansion valve 11, a first evaporator 13, a first and second hermetically sealed compressor and motor 15 and 17, respectively, a condenser 21, a second expansion valve 23, and a second evaporator 25, connected together in that order, in series, in a refrigerant flow relationship by conduit 26. A phase separator 27 provides intercooling between the two compressors and comprises a closed receptacle having at the upper portion an inlet for admitting liquid and gaseous phase refrigerant and having two outlets. The first outlet is located at the bottom the receptacle and provides liquid refrigerant. The second outlet is provided by a conduit 29 which extends from the interior of the upper portion of the receptacle to the exterior. The conduit is in flow communication with the upper portion and is arranged so that liquid refrigerant entering the upper portion of the receptacle cannot enter the open end of the conduit 29. Two phase refrigerant from the outlet of the second evaporator 25 is connected to the inlet of the phase separator 27. The phase separator provides liquid refrigerant to the first expansion valve 11. The phase separator also provides saturated refrigerant vapor which combines with vapor output by the first hermetically sealed compressor and motor 15 and together are connected to the inlet of the second hermetically sealed compressor and motor 17.

The first evaporator 13 contains refrigerant at a temperature of approximately $-10°$ F. during operation for cooling a freezer compartment 31. The evaporator 13 is situated in an evaporator chamber defined by walls 33 of the freezer and a barrier 35. A fan 37 situated between the evaporator chamber and the rest of the freezer compartment, when operating, draws air from the freezer into the evaporator chamber over the evaporator 13 and back into the freezer compartment 31. The second evaporator 25 contains refrigerant at a temperature of approximately 25° F. during operation for cooling the fresh food compartment 41. The evaporator 25 is situated in an evaporator chamber in the fresh food compartment 25 defined by walls 43 of the refrigerator compartment and a barrier 45. A fan 47 situated between the evaporator chamber and the rest of the fresh food compartment 41, when operating, draws air from the rest of the compartment across the evaporator and back to the compartment.

A thermostatic control 51 is situated in the freezer compartment 31 and another thermostatic control 53 in the fresh food compartment 41. Both thermostatic controls are adjustable by the user. A servovalve 55 which is electrically actuated is situated in the conduit 26 between the evaporator 13 of the freezer compartment 31 and the hermetically sealed compressor and motor. The servovalve 55 upon actuation restricts the flow of refrigerant to approximately half the inlet pressure. Thermostatic control 51 in the freezer compartment is coupled to both hermetically sealed motors 57 and 59 through motor controllers 61 and 63 and to the fans 37 and 47 in both compartments 31 and 41.

In operation, when the freezer thermostatic control 51 detects that the temperature has risen above a predetermined value both compressors 65 and 67 are operated by sending a signal from the thermostatic controllers to the motor controllers 61 and 63 as well as both fans 37 and 47 which also have motor controllers. All the motor controllers are connected to external power supplies (not shown). When the thermostatic control 53 in the fresh food compartment 41 rises above a preselected set point, the servovalve 55 is actuated reducing the inlet pressure in the suction line leading to compressor 65.-In a system using R-12 refrigerant, throttling the nominal 19 psia inlet pressure to 9.5 psia, causes the mass flow through the evaporator 13 in the freezer compartment to decrease by more than 50%, thereby decreasing evaporator 13 cooling rate by more than 50%.

The result of decreasing the cooling rate of the evaporator 13 is that it takes a longer time for the freezer compartment to be cooled to the temperature at which the thermostatic control 51 shuts off the compressors. Thus, when the servovalve 55 is actuated, the compressors operate for a longer time and the fresh food compartment receives more cooling than when the servovalve 55 is not actuated. This throttling is an irreversible process and is accompanied by a decrease of cooling efficiency. For the cycle shown, the mechanical energy to compress the gas remains the same, while the cooling rate decreases by more than 50%. However, for this cycle, the throttled compressor 65 only uses approximately 12% of the system's mechanical energy while providing approximately 50% of its cooling. Therefore, a decrease in the efficiency of the compressor 65 and evaporator 13 does not have a substantial effect on overall system efficiency.

Figure 2:
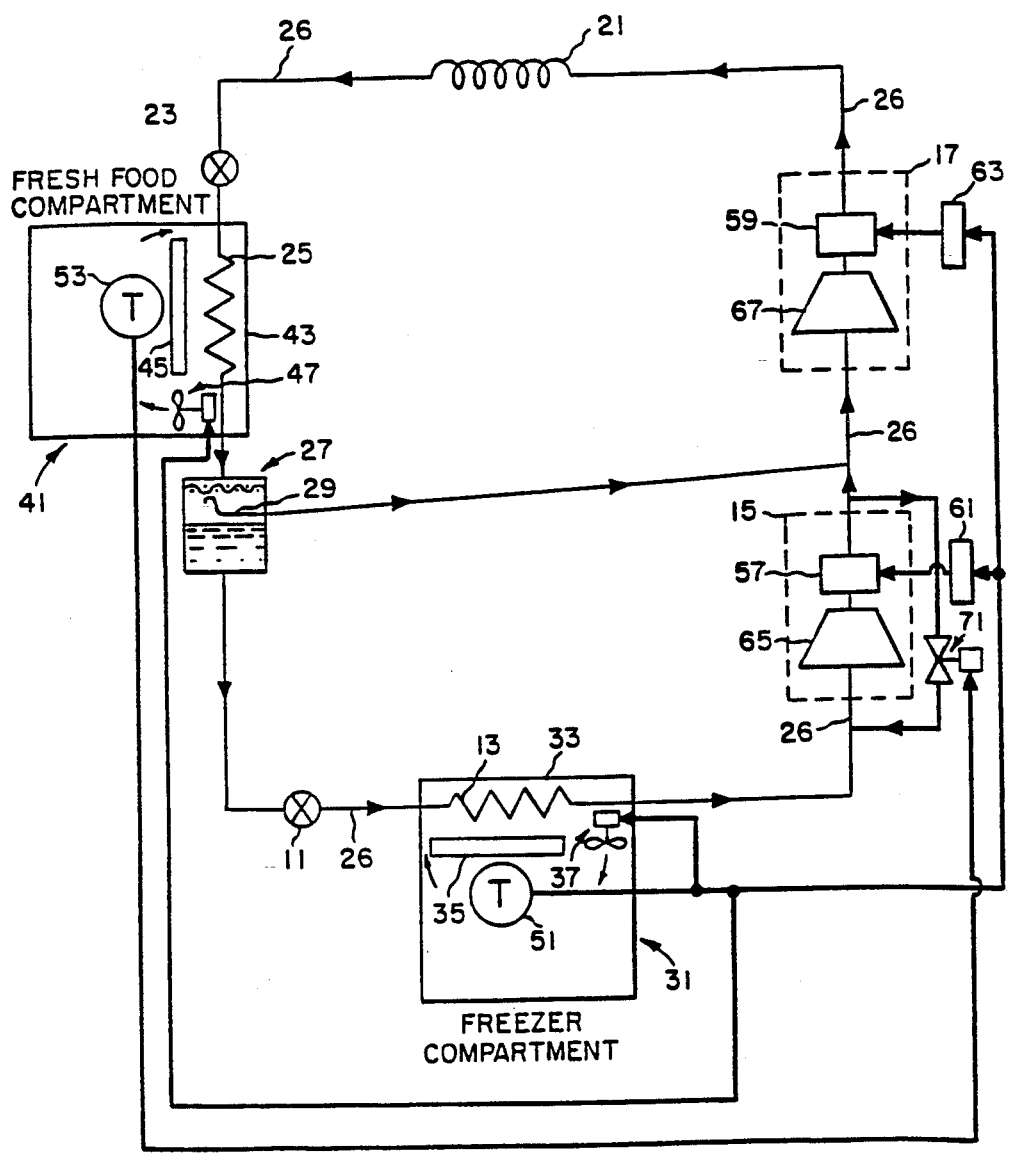
FIG. 2 is a schematic representation of one embodiment of a dual evaporator two stage refrigerator system with a control for controlling the relative cooling rates of the evaporators in accordance with the present invention.

Referring now to FIG. 2, the same dual evaporator, two stage cycle is shown with the same controls except that a servovalve 71 is positioned to provide a bypass across hermetically sealed compressor and motor 15. Servovalve 71 provides an open and closed position. The open position recirculates some already compressed gas to the compressor 65 inlet.

During operation, the thermostatic control in the freezer 51 still operates both compressors 15 and 17 and fans 37 and 47 when it detects a temperature above its predetermined set point. The servovalve 71 when actuated by the thermostatic control 53 in the fresh food compartment 41 rising above its preset point causes the servovalve 71 to open reducing the mass flow rate through the evaporator 13 by approximately 50%. An advantage to the control scheme of FIG. 2 as compared to FIG. 1 is that since full flow occurs through the compressor 65 inlet section, the amount of lubricating oil entrained within the refrigerant vapor is not effected. The reduction in efficiency of the system of FIG. 1 and FIG. 2 when the servovalves are operating are approximately the same.

In the controls of FIG. 1 and 2, the compressors 65 and 67 are operated based on freezer temperature and the cooling rate in the freezer compartment can be decreased when the temperature is above a predetermined amount in the fresh food compartment.

Figure 3:
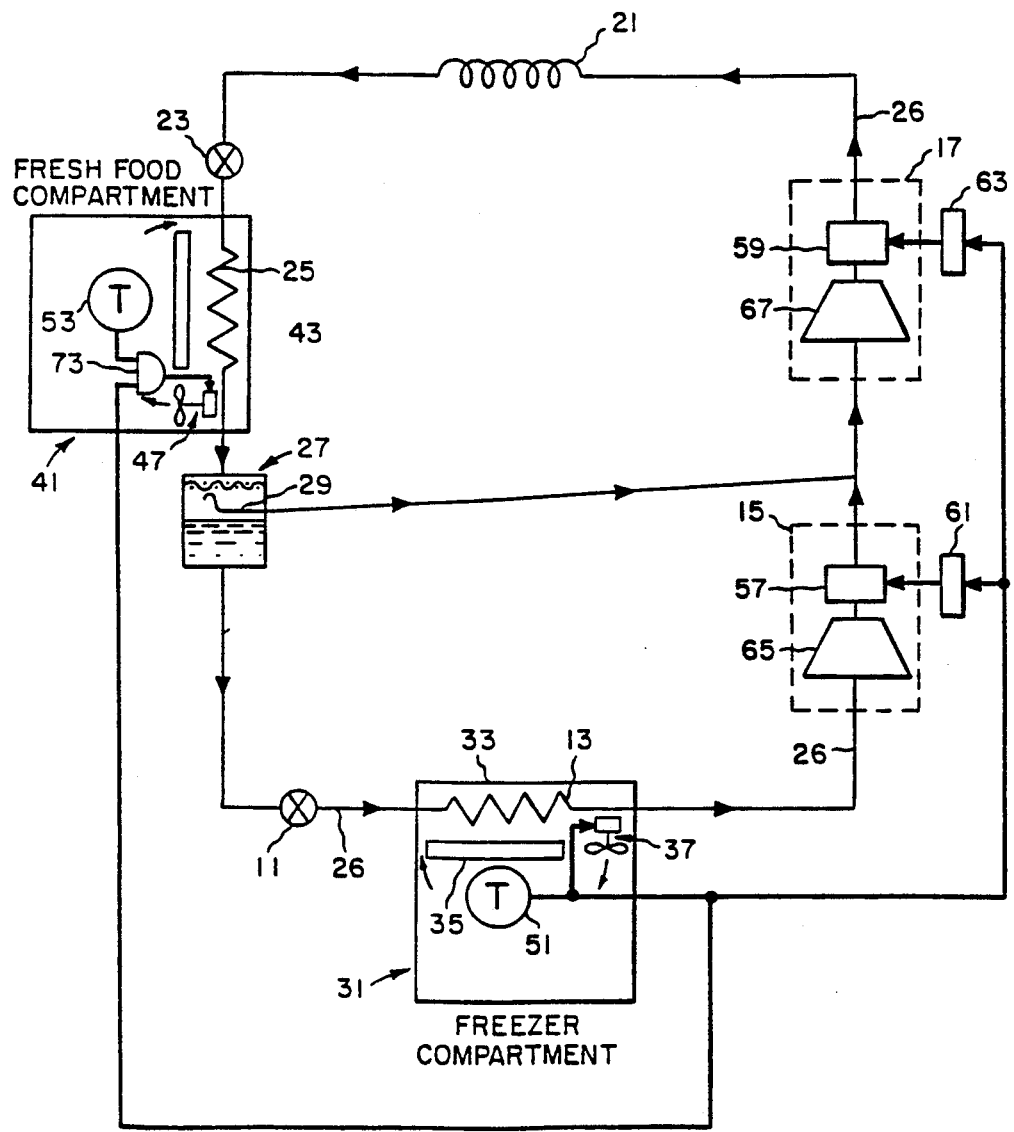
FIG. 3 is a schematic representation of another embodiment of the dual evaporator refrigerator system with a control for controlling the relative cooling rates of the two evaporators in accordance with the present invention.

Referring now to FIG. 3 the dual evaporator two stage cycle is shown without any servovalves. The thermostatic control 53 of the fresh food compartment is connected to one input of a logical AND gate 73 and the other input is provided from the other thermostatic control 51. The output of the AND gate 73 is connected to the fan 47. The thermostatic control 51 in the freezer compartment when above a preset temperature activates both compressors 65 and 67 and the fan 37 in the freezer compartment 31. The thermostatic control 53 in the fresh food compartment activates the fresh food fan when the temperature rises above its set point and the compressors are operating. When the compressors are operating and the fresh food thermostat is below its set point the fan 47 in the fresh food compartment 41 is shut off because AND gate 73 is not enabled and cooling of the fresh food compartment 41 is stopped. The cooling rate produced by the evaporator 13 in the freezer compartment 31 is only minimally affected. System efficiency will decrease somewhat while the fresh food compartment fan 47 does not operate.

Figure 4:
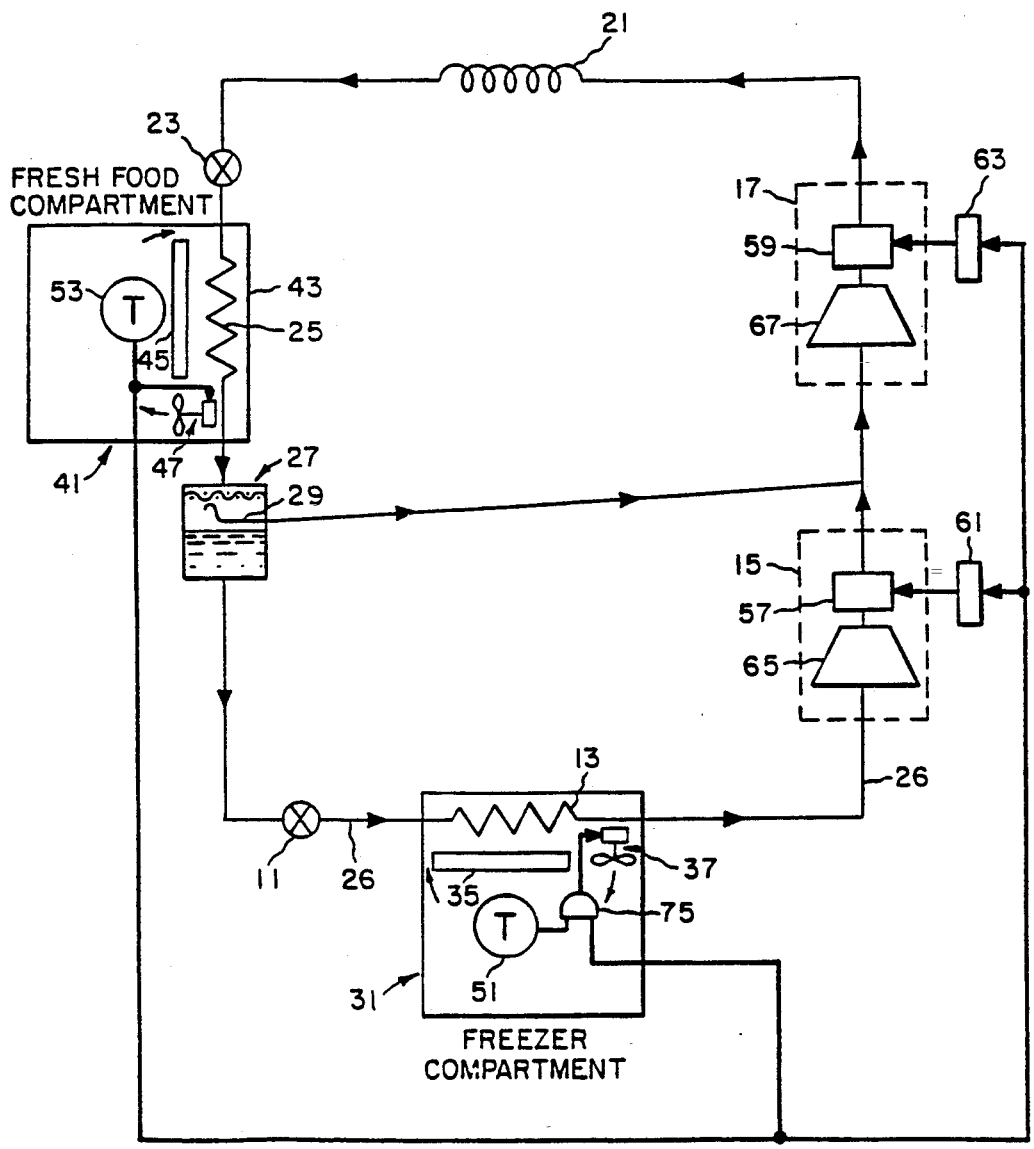
FIG. 4 is a schematic representation of another embodiment of the dual evaporator refrigerator system with a control system in accordance with the present invention.

Referring now to FIG. 4, a dual evaporator two stage cycle is shown. The thermostatic control of the fresh food compartment 41 is connected to both motor controllers 61 and 63 and to fan 47 and causes both compressors 65 and 67 to operate as well as the fresh food fan 47 when the temperature of the fresh food compartment goes above a preset point. The thermostatic control 51 in the freezer compartment 31 is connected to one input of a logical AND gate 75 and the output of the fresh food thermostatic control 53 is connected to the other. The output of the AND gate is connected to fan 37. When the freezer compartments 31 temperature goes above a preset temperature, the fan 37 in the freezer compartment is operated if the compressors 65 and 67 are also operating. When the freezer evaporator fan 37 is not operating and the compressors are operating, cooling of the freezer compartment ceases, while continuing in the fresh food compartment 41. The cooling rate produced by the fresh food evaporator 25 is only minimally effected. System efficiency will decrease somewhat when the compressors are operating and the freezer fan 37 is not.

Figure 5:
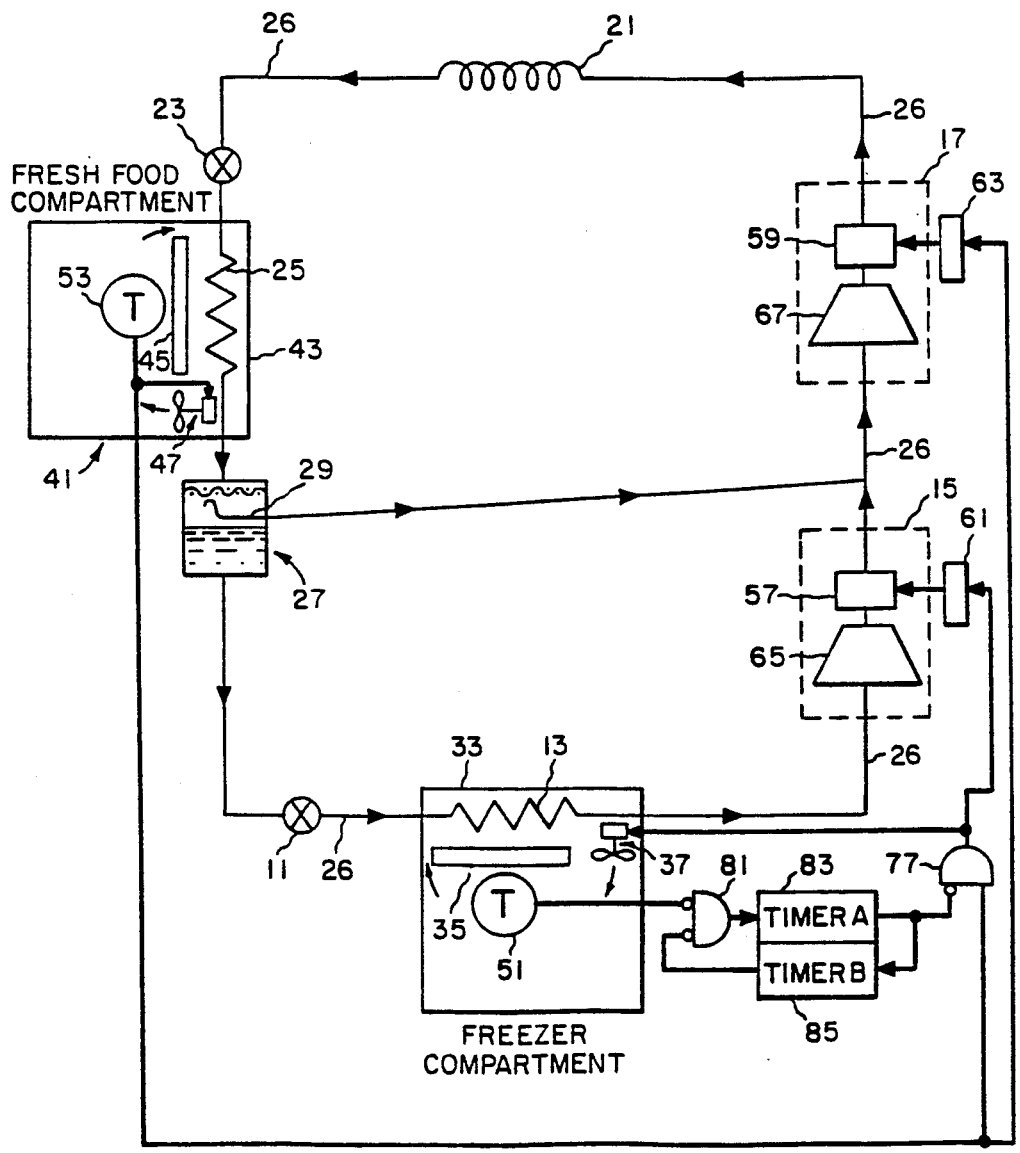
FIG. 5 is a schematic representation of another embodiment of a dual evaporator two stage refrigerator system with a control for controlling the relative cooling rates of the evaporators in accordance with the present invention.

Referring now to FIG. 5 a dual evaporator two stage cycle is again shown. The thermostatic controller 53 in the fresh food compartment 41 is connected to the compressor motor controller 63 and fan 47 and controls the operation of the compressor 67 and the fan 47. The thermostatic controller 53 also provides one input to AND gate 77, with the output of the AND gate connected to motor controller 61 of compressor 65. The output of the AND gate 77 also controls the freezer fan 37.

The thermostatic controller 51 of the freezer 31 when it rises above a preset temperature provides a logical "1" or high state to an inverting input of an AND gate 81. The output of AND gate 81 is connected to a timer 83 which when receiving a transitioning from the low to high state outputs a high signal for a predetermined length of time. The output of timer 83 is also connected to the input of timer 85 which also provides a high output for a predetermined duration when triggered by receiving a signal transitioning from a low to a high state. The output of timer 85 is connected to an inverting input of AND gate 77. An inverting input changes the logical state of the input signal before it is supplied to the AND gate. An inverting input acts as if a separate inverter receives the signal and then provides it to the AND gate.

In operation, the fresh food thermostat 53 controls compressor 67 and fan 47. When the temperature in the freezer goes above a predetermined set point, a logical one signal is provided by the thermostat to the inverting input of AND gate 81. The output of timer 83 when not operating, is at a low state which is connected to the inverting input of AND gate 77. When the fresh food thermostat is also above its set point compressor 65 and fan 37 operate. When the freezer thermostat goes below a predetermined set point, a logical "0" signal is provided to one inverting input of AND gate 81. The timer 85 when not operating has its output at a low state connected to the other inverting terminal of AND gate 81 enabling AND gate 81 and starting timer 83 which provides a high signal to one inverting input of AND gate 77 disabling AND gate 77 and compressor 65 and fan 37 do not operate. Timer 85 is triggered by timer 83 and disables AND gate 81 until timer 85 times out thereby controlling the time between subsequent shut downs of compressor 65 when compressor 67 is operating. When only one compressor is operating, refrigerant tends to accumulate in the phase separator 27 limiting the time during which one compressor operation can continue. Therefore, timer 83 determines how long single compressor operation occurs and timer 85 determines how long after timer 83 was first triggered it can be triggered again to allow single compressor operation to again occur.

Figure 6:
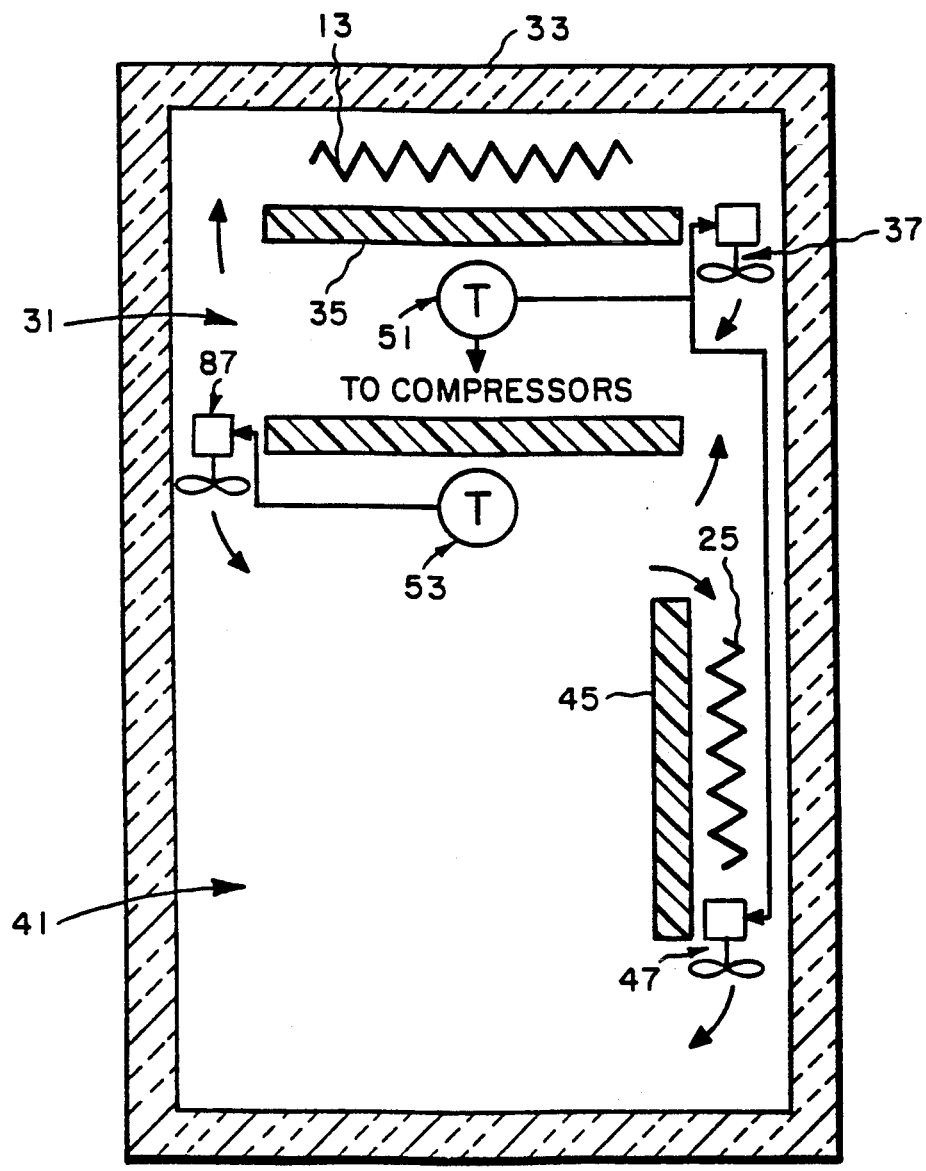
FIG. 6 is a schematic representation of the interior of the fresh food and freezer compartments of a refrigerator in accordance with the present invention showing a control for controlling the relative cooling of the freezer and fresh food compartments where dual evaporators are used.

Referring now to FIG. 6, a refrigerator having separate evaporator 25 in the fresh food compartment 31 and a separate evaporator 13 in the freezer compartment 31 is shown. The thermostatic controller 51 in the freezer compartment is connected to the motor controllers of the hermetically sealed compressors (not shown) and to fans 37 and 47 in the freezer and fresh food compartments, respectively. The thermostatic controller 53 is connected to a fan 87 located in one of the two passageways interconnecting the fresh food and freezer compartments. Fan 87 can comprise a low energy consumption fan such as a piezoelectric fan.

In operation, when thermostatic controller 51 detects the temperature in the freezer has risen above the user selected set point, the compressors (not shown) operate, providing cooled refrigerant in the two evaporators 13 and 25. Fans 37 and 47 circulate air over the evaporators 13 and 25. When the fresh food compartment thermostatic controller detects that the temperature in the fresh food compartment is above the desired user selected temperature fan 87 operates circulating air between the compartments cooling the fresh food compartment while warming the freezer compartment. Fan 87 operates whenever the fresh food compartment is above a preselected temperature, whether or not the compressors are operating.

The compressors shown do not have to be intercooled in order for the controls provided to regulate freezer and fresh food compartment temperature. Other intercooling techniques such as shown in copending application Ser. No. 07/288,848 can alternatively be used. The control shown in FIGS. 3 and 4 do not require a two stage compressor only two evaporators one operating at temperature to cool the freezer compartment and one operating to cool the fresh food compartment. The control of FIG. 6 does not require two compressors or two evaporators. A single evaporator located in the freezer compartment with the freezer thermostat controlling the single compressor operation is sufficient. The thermostatic control in the fresh food compartment would still be used to operate the fan controlling airflow between the compartments.

The embodiments of FIGS. 1, 2 and 3 can be combined with the control strategy of FIG. 6 which provides for air circulation between the fresh food and freezer compartments when the fresh food compartment temperature is above a predetermined set point. The combination of the air circulation controls with the controls of FIGS. 1, 2, and 3 would provide improved fresh food compartment temperature regulation.

The foregoing has described a control for regulating the cooling rates of a refrigerator equipped with a dual evaporator refrigerator system.

While the invention has been particularly shown and described with reference to several preferred embodiments thereof, it will be understood by those skilled in the art that various changes in form and detail may be made without departing from the spirit and scope of the invention.

What we claim is:

1. A refrigerator apparatus comprising:
    a freezer compartment;
    a fresh food compartment;
    a refrigerator system having a compressor, a condenser, a first expansion valve, a first evaporator situated in said freezer compartment, a second expansion valve, a second evaporator situated in said fresh food compartment said refrigerator system elements connected in series in a closed loop in a refrigerant flow relationship;
    a first fan situated in said freezer compartment for providing air flow over said first evaporator;
    a second fan situated in said fresh food compartment for providing air flow over said second evaporator;
    a first thermostatic controller situated in said freezer compartment for maintaining a desired temperature in said freezer compartment by causing said first fan to operate as necessary when said compressor is operating; and
    a second thermostatic controller situated in said fresh food compartment for maintaining a desired temperature in said fresh food compartment by causing said compressor and said second fan to operate.

* * * * *